US008713071B1

(12) United States Patent
Jain

(10) Patent No.: US 8,713,071 B1
(45) Date of Patent: Apr. 29, 2014

(54) DETECTING MIRRORS ON THE WEB

(75) Inventor: Arvind Jain, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/289,688

(22) Filed: Nov. 4, 2011

Related U.S. Application Data

(63) Continuation of application No. 11/199,204, filed on Aug. 9, 2005, now Pat. No. 8,055,626.

(51) Int. Cl.
*G06F 7/00* (2006.01)
*G06F 17/30* (2006.01)
(52) U.S. Cl.
USPC .......................................... 707/802; 707/803
(58) Field of Classification Search
None
See application file for complete search history.

(56) References Cited

U.S. PATENT DOCUMENTS

| 6,092,100 | A | 7/2000 | Berstis et al. | |
|---|---|---|---|---|
| 6,286,006 | B1 * | 9/2001 | Bharat et al. | 1/1 |
| 6,487,555 | B1 * | 11/2002 | Bharat et al. | 1/1 |
| 6,507,854 | B1 | 1/2003 | Dunsmoir et al. | |
| 6,598,051 | B1 | 7/2003 | Wiener et al. | |
| 6,954,456 | B2 | 10/2005 | Cranor et al. | |
| 7,165,216 | B2 | 1/2007 | Chidlovskii et al. | |
| 2002/0087588 | A1 | 7/2002 | McBride et al. | |
| 2005/0097185 | A1 | 5/2005 | Gibson et al. | |
| 2006/0059163 | A1 | 3/2006 | Frattura et al. | |

OTHER PUBLICATIONS

Co-pending U.S. Appl. No. 11/199,204, filed Aug. 9, 2005, and titled "Detecting Mirrors on the Web," 31 pages.
Co-pending U.S. Appl. No. 11/094,791, filed Mar. 31, 2005, and titled "Near-Duplicate Document Detection for Web Crawling," 46 pages.

* cited by examiner

*Primary Examiner* — Rehana Perveen
*Assistant Examiner* — Raheem Hoffler
(74) *Attorney, Agent, or Firm* — Harrity & Harrity, LLP

(57) ABSTRACT

A system obtains multiple signals associated with first and second hostnames or subtrees. The system uses the multiple signals to determine whether the first hostname or subtree is a mirror of the second hostname or subtree. The multiple signals may include, for example, a same link structure and/or sitemap for the first and second hostnames or subtrees, duplicate content associated with the first and second hostnames or subtrees, a same Internet Protocol (IP) address or subnet for the first and second hostnames or subtrees, a same owner for the first and second hostnames or subtrees, nearly duplicate content associated with the first and second hostnames or subtrees, similarity between the hostnames of the first and second hostnames or subtrees; and/or an indication that one hostname or subtree of the first and second hostnames or subtrees redirects to the other hostname or subtree.

23 Claims, 7 Drawing Sheets

DETECTING MIRRORS ON THE WEB

RELATED APPLICATION

This application is a continuation of U.S. patent application Ser. No. 11/199,204, filed Aug. 9, 2005, the contents of which are incorporated herein by reference.

BACKGROUND

1. Field of the Invention

Implementations described herein relate generally to information retrieval and, more particularly, to detecting hostnames/subtrees that are mirrors of one another on the web.

2. Description of Related Art

The World Wide Web ("web") contains a vast amount of information. A specific item of content on the web may often be accessible at multiple different addresses (e.g., uniform resource locators (URLs)). In some instances, a website has more than one hostname pointing to the same content. For example, the hostnames www.google.com and google.com may both point to the same content. In other instances, multiple names within a host may refer to the same content. For example, www.amazon.com/electronics/apple_ipod.html may refer to the same piece of content as www.amazon.com/products/company/apple/apple_ipod.html. In other instances, all of the content on one website may be the same as the content on another website. For example, all of the content under both www.whitehouse.gov/barney and www.barney.gov may be the same.

When multiple hostnames refer to the same content (i.e., the multiple hostnames are "mirrors" of one another), problems can be created for search engines that "crawl" and index content associated with the multiple hostnames. If, for example, a search engine does not recognize two hostnames, that refer to the same content, as being the same, the search engine will crawl and index pages from both hostnames. This wastes crawl bandwidth and index space, and puts twice the crawl load on the website with the two hostnames. Also, multiple hostnames that refer to the same content can create problems in ranking search results. Using existing ranking techniques, a given web page will be more highly ranked among other search results if it is pointed to by a large number of other pages. Therefore, if two hostnames, that refer to the same content, are treated separately for the purpose of ranking, the ranking of each hostname may only actually be about half what it would be if the hostnames were ranked together.

SUMMARY

According to one aspect, a method may include obtaining multiple signals associated with first and second hostnames or subtrees. The method may further include using the multiple signals to determine whether the first hostname or subtree is a mirror of the second hostname or subtree.

According to another aspect, a method may include identifying a pair of hostnames or subtrees as being potentially similar. The method may further include determining whether the pair of hostnames or subtrees are mirrors of one another using multiple signals associated with the pair of hostnames or subtrees.

According to a further aspect, a method may include identifying path components associated with hostnames or subtrees and sorting the hostnames or subtrees based on the path components to produce a sorted list. The method may further include comparing sequentially adjacent hostnames or subtrees from the sorted list to identify hostnames or subtrees that are potentially similar.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Consistent with aspects of the invention, mirrors (e.g., hostnames or subtrees which refer to the same content) may be identified using multiple different signals associated with hostnames or subtrees. Identification of mirrors on the web enables a search engine to crawl and index only a single unique piece of content and eliminates redundant crawling and indexing effort.

A "document," as the term is used herein, is to be broadly interpreted to include any machine-readable and machine-storable work product. A document may include, for example, an e-mail, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
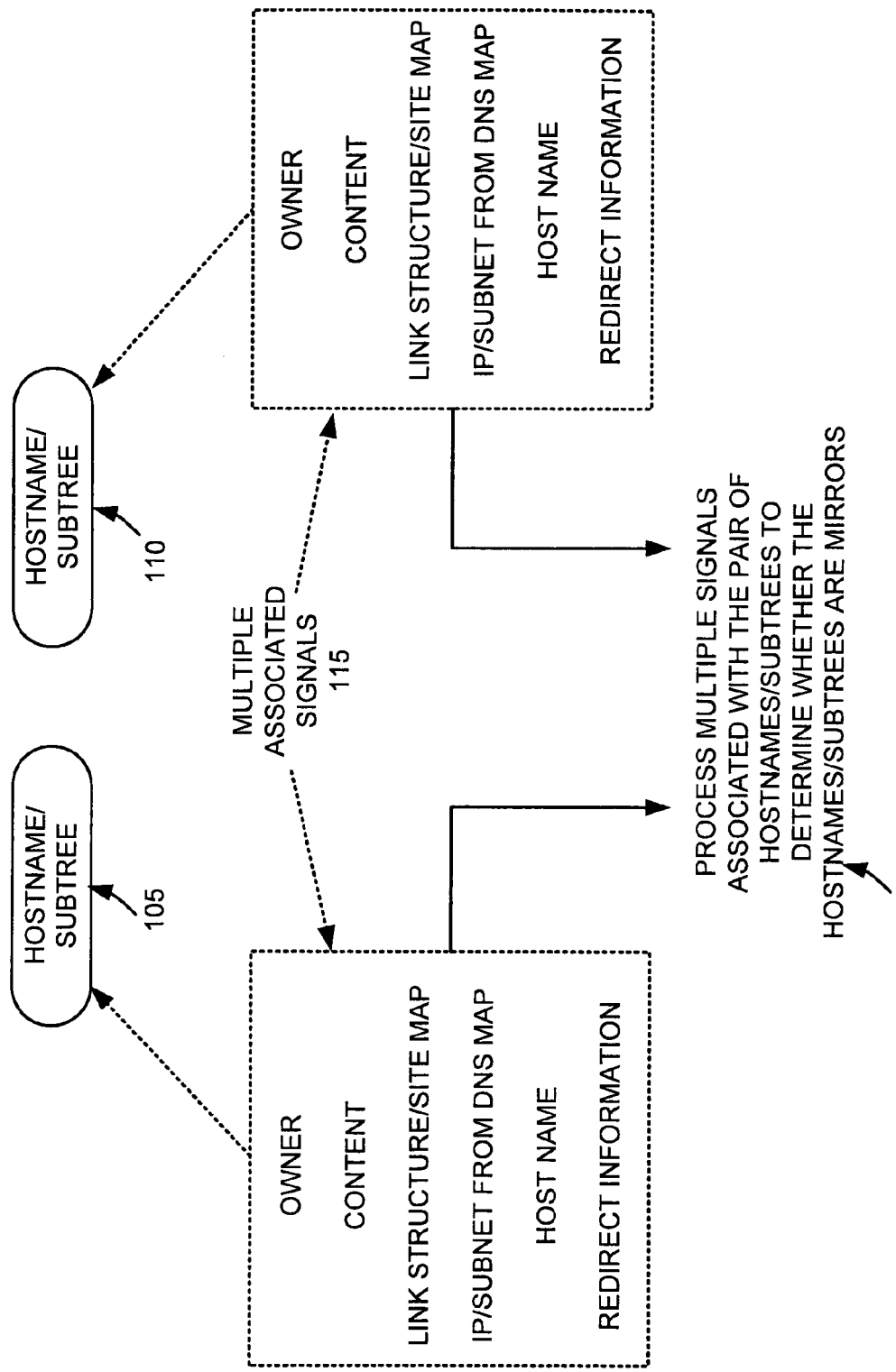
FIG. 1 is an exemplary diagram of an overview of an implementation of the invention in which multiple signals associated with a pair of hostnames/subtrees are used to determine whether the hostnames/subtrees are mirrors of one another.

FIG. 1 illustrates an exemplary overview of an implementation of the invention in which multiple signals associated with a pair of hostnames/subtrees are used to determine whether the hostnames/subtrees are the same (e.g., are mirrors of one another). As shown in FIG. 1, a first hostname/subtree 105 may be identified as being potentially similar to a second hostname/subtree 110. Hostname/subtree 105 and hostname/subtree 110 may identify a corresponding host/server in a network. Alternatively, hostname/subtree 105 and hostname/subtree 110 may each include a respective subtree that identifies a section of a directory hierarchy. Each subtree may start at a particular directory and may include all, or part of, subdirectories and objects below that directory in the directory hierarchy.

Multiple signals 115 may be obtained that are associated with hostnames/subtrees 105 and 110. The multiple signals 115 may be derived from various sources including, for example, a crawl repository that includes all the documents and links that a search engine discovers when "crawling" sites on the web. The multiple signals 115 may further be derived from hostname-to-IP domain name server (DNS) maps, "who is" databases, and/or any other hostname/subtree specific data that can be obtained. "Who is" databases typically contain nameserver, registrar, and in some cases, full contact information, about a given hostname.

The signals used to identify whether hostname/subtree 105 and hostname/subtree 110 are the same may include the following:
1) same link structure and/or sitemap for the two hostnames/subtrees;
2) exactly the same content associated with the two hostnames/subtrees;
3) same Internet Protocol (IP) address or subnet for the two hostnames/subtrees from the DNS map;
4) same owner for both hostnames/subtrees (e.g., from a "who is" database);
5) near-duplicate content associated with the two hostnames/subtrees;
6) similarity in the hostnames for the two hostnames/subtrees; and
7) redirect information indicating that one hostname/subtree redirects to the other hostname/subtree.

Other signals may be used, alternatively, or in addition to the signals set forth above.

After obtaining the multiple associated signals 115 for hostname/subtree 105 and hostname/subtree 110, then the signals may be processed 120 to determine whether hostname/subtree 105 is the same as hostname/subtree 110 (e.g., a mirror). The identification of hostnames/subtrees as mirrors of one another may be repeated across multiple hostnames/subtrees so that a search engine can eliminate mirrors from the content that it crawls. Through the elimination of mirrors, consistent with aspects of the invention, a search engine may crawl and index only one unique piece of content for each pair of hostnames/subtrees that are the same.

Exemplary Network Configuration

Figure 2:
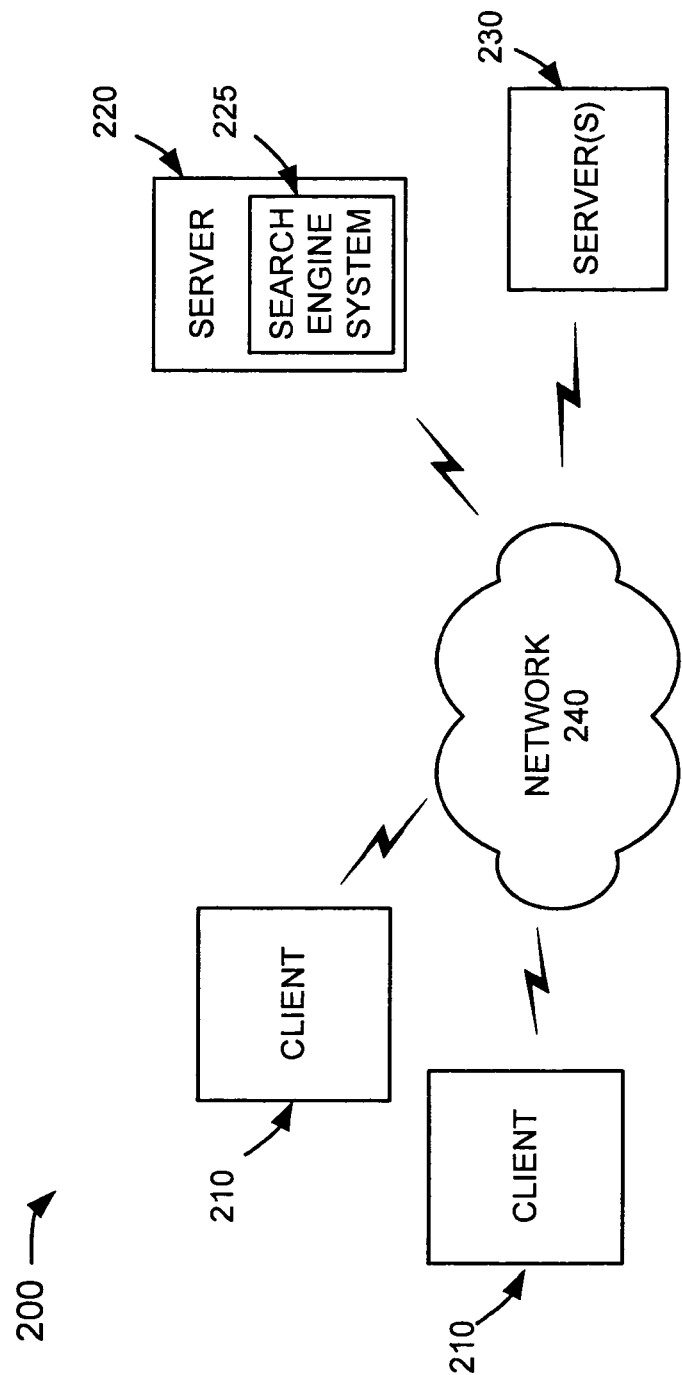
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform some functions of a server and a server may perform some functions of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220 and 230 may include server entities that access, fetch, aggregate, process, search, and/or maintain documents in a manner consistent with the principles of the invention. Clients 210 and servers 220 and 230 may connect to network 240 via wired, wireless, and/or optical connections.

In an implementation consistent with the principles of the invention, server 220 may include a search engine system 225 usable by users at clients 210. Server 220 may implement a data aggregation service by crawling a corpus of documents (e.g., web documents), indexing the documents, and storing information associated with the documents in a repository of documents. The data aggregation service may be implemented in other ways, such as by agreement with the operator(s) of data server(s) 230 to distribute their hosted documents via the data aggregation service. Search engine system 225 may execute a search, received from a user at a client 210, on the corpus of documents stored in the repository of documents.

Server(s) 230 may store or maintain documents that may be crawled by server 220. Such documents may include data related to published news stories, products, images, user groups, geographic areas, or any other type of data. For example, server(s) 230 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Exemplary Client/Server Architecture

Figure 3:
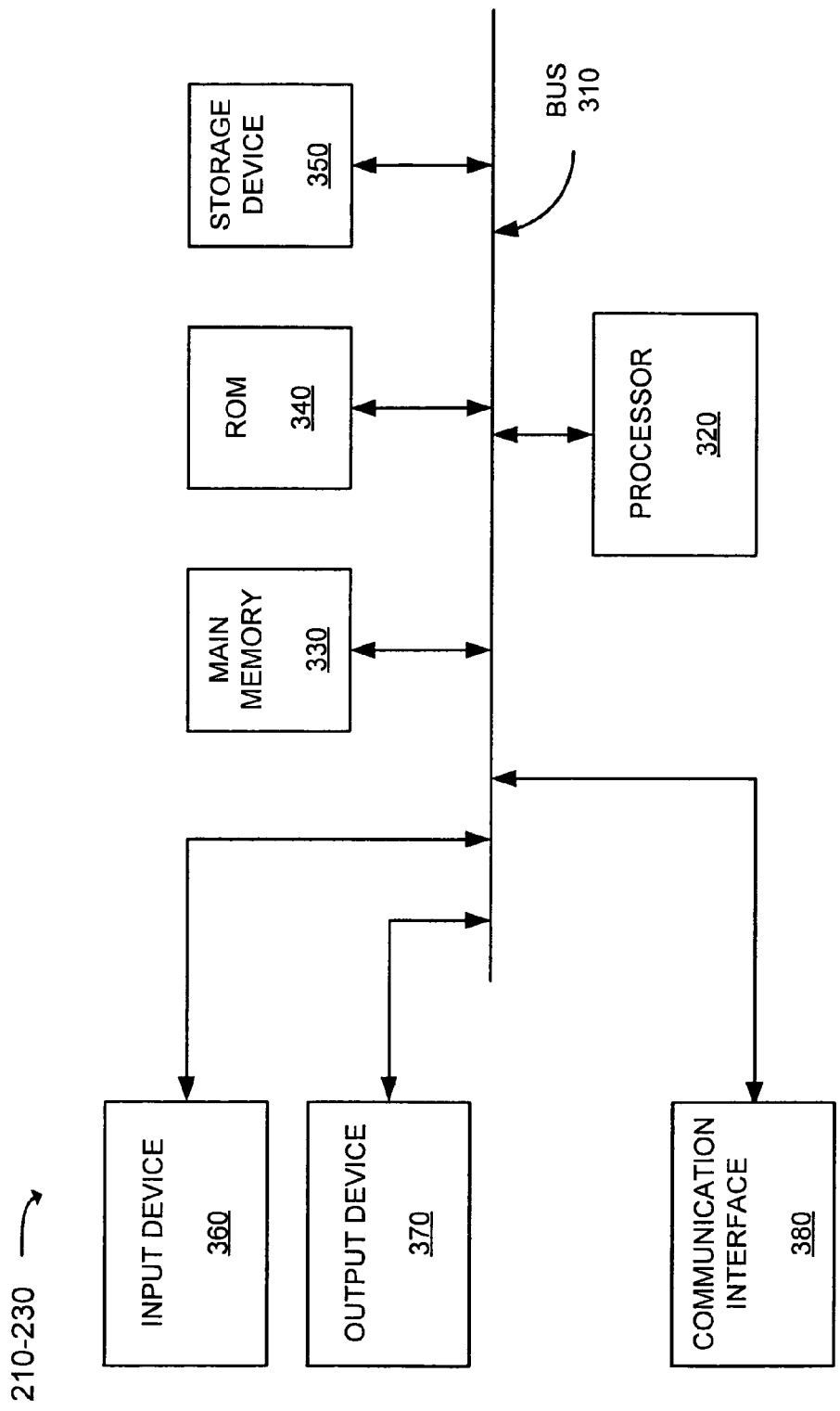
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Functional Diagram of Search Engine System

Figure 4:
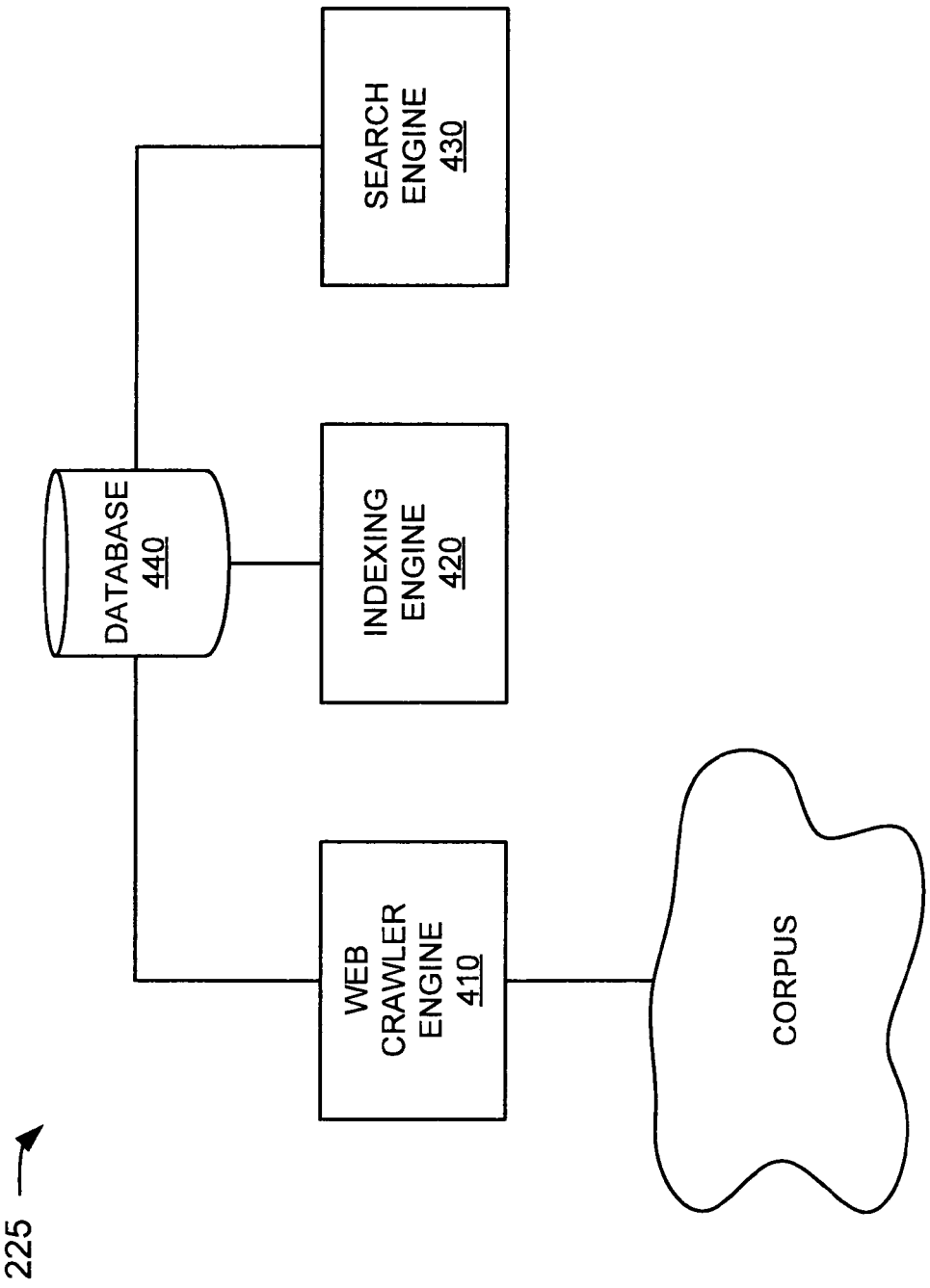
FIG. 4 is an exemplary functional block diagram of a portion of the search engine system of FIG. 2 according to an implementation consistent with the principles of the invention.

FIG. 4 is an exemplary functional block diagram of a portion of search engine system 225 according to an implementation consistent with the principles of the invention. Search engine system 225 may include a web crawler engine 410, an indexing engine 420, and a search engine 430 connected to a database 440. In one implementation, web crawler engine 410, indexing engine 420, and/or search engine 430 may be implemented by software and/or hardware within search engine system 225. In another implementation, web crawler engine 410, indexing engine 420, and/or search engine 430 may be implemented by software and/or hardware within another device or a group of devices separate from or including search engine system 225.

Generally, web crawler engine 410 may operate from a list of addresses to fetch the corresponding documents from a corpus of documents (e.g., the web). Web crawler engine 410 may determine whether a fetched document is a mirror of a previously-fetched document. When the fetched document is a mirror of a previously-fetched document, web crawler engine 410 may discard the document and not crawl the outgoing links in the document. Additionally, given a link, the document associated with the link may be crawled only if the document is expected not to be a mirror of an existing crawled document. For example, if www.google.com/foo has been crawled, and it is known that www.google.com and google.com are mirrors (i.e., all documents under these hosts are the same), then if a link to google.com is later found in a newly crawled document, there is no need to crawl this link as it is expected to be a mirror of www.google.com. When the fetched document is not a mirror of a previously-fetched document, web crawler engine 410 may extract the addresses (e.g., URLs) associated with the outgoing links in the document and add the addresses to the list of addresses to be crawled. Web crawler engine 410 may also store information associated with the document, such as all or part of the document, in database 440 (e.g., the crawl repository).

Indexing engine 420 may operate upon documents crawled by web crawler engine 410. For example, indexing engine 420 may create an index of the documents and store the index in database 440. Indexing engine 420 may update the index as new documents are crawled and added to database 440.

Search engine 430 may identify documents that are relevant to a user's search query. For example, search engine 430 may search the index in database 440 based on a search query. Search engine 430 may score or rank documents identified by the search, sort the documents based on their scores, and form search results based on the sorted documents.

Database 440 may be embodied within a single memory device or within multiple (possibly distributed) memory devices. Database 440 may store the list of addresses used by web crawler engine 410, information associated with documents crawled by web crawler engine 410, and/or the index generated by indexing engine 420.

Exemplary Functional Diagram of Web Crawler Engine

Figure 5:
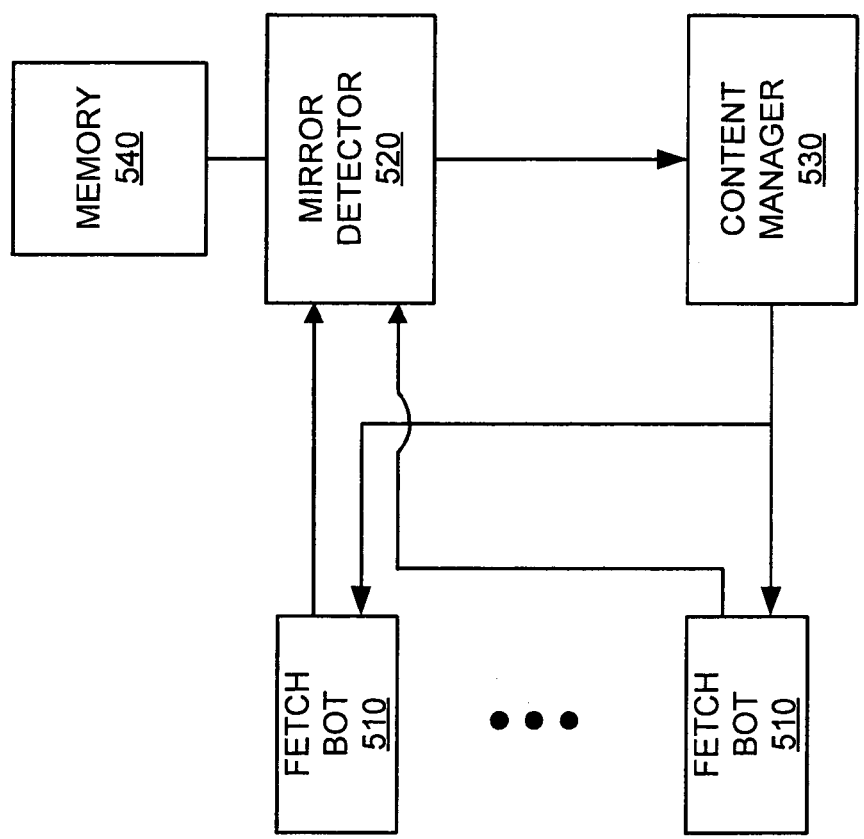
FIG. 5 is an exemplary functional block diagram of the web crawler engine of FIG. 4 according to an implementation consistent with the principles of the invention.

FIG. 5 is an exemplary functional block diagram of web crawler engine 410 according to an implementation consistent with principles of the invention. In one implementation, web crawler engine 410 may be implemented by software and/or hardware within search engine system 225. In another implementation, web crawler engine 410 may be implemented by software and/or hardware within another device or a group of devices separate from or including search engine system 225.

Web crawler engine 410 may include fetch bots 510, mirror detector 520, content manager 530, and memory 540. A fetch bot 510 may fetch a document from a corpus of documents and provide the fetched document to mirror detector 520. Mirror detector 520 may determine whether the fetched document is a mirror of a previously-fetched document based on information in memory 540. Mirror detector 520 may also determine whether an uncrawled link is a mirror of some other uncrawled link or crawled document.

In one implementation, mirror detector 520 may retrieve hostnames/subtrees from database 440 and may selectively pair hostnames/subtrees if they are potentially mirrors of one another. Mirror detector 520 may obtain multiple signals associated with each pair of paired hostnames/subtrees from various sources, including, for example, the crawl repository stored in database 440, hostname-to-IP DNS maps, "who is" databases, or other sources of host specific information. Mirror detector 520 may then determine which pairs of hostnames/subtrees are mirrors as described with respect to FIG. 6 below.

When mirror detector 520 determines that the fetched document is a mirror of a previously-fetched document, mirror detector 520 may discard the fetched document. When mirror detector 520 determines that the fetched document is not a mirror of a previously-fetched document, mirror detector 520 may provide the fetched document to content manager 530. Alternatively, mirror detector 520 may provide the fetched document to content manager 530 regardless of whether the fetched document is a mirror of a previously-fetched document. Mirror detector 520 may also annotate outgoing links from fetched documents as to whether the outgoing links are expected to be mirrors or not.

When the fetched document is a mirror of a previously fetched document and mirror detector 520 provides the fetched document to content manager 530, content manager 530 may ignore the outgoing links in the fetched document. Content manager 530 may further ignore the outgoing links in the fetched document if the outgoing links are expected to be mirrors based on the annotations provided by mirror detector 520. When the fetched document is not a mirror of a previously-fetched document, content manager 530 may parse the fetched document to determine the outgoing links that the fetched document contains. Content manager 530 may add addresses associated with the outgoing links to a list of addresses that it maintains. Content manager 530 may provide addresses from the list to fetch bots 510 as instructions for fetch bots 510 to fetch (i.e., crawl) the corresponding documents. Content manager 530 may also store information associated with the fetched document (e.g., all or part of the fetched document) in database 440 (FIG. 4). Content manager 530 may, for example, store hostnames associated with fetched documents in database 440.

Exemplary Mirror Determination Process

Figure 6:
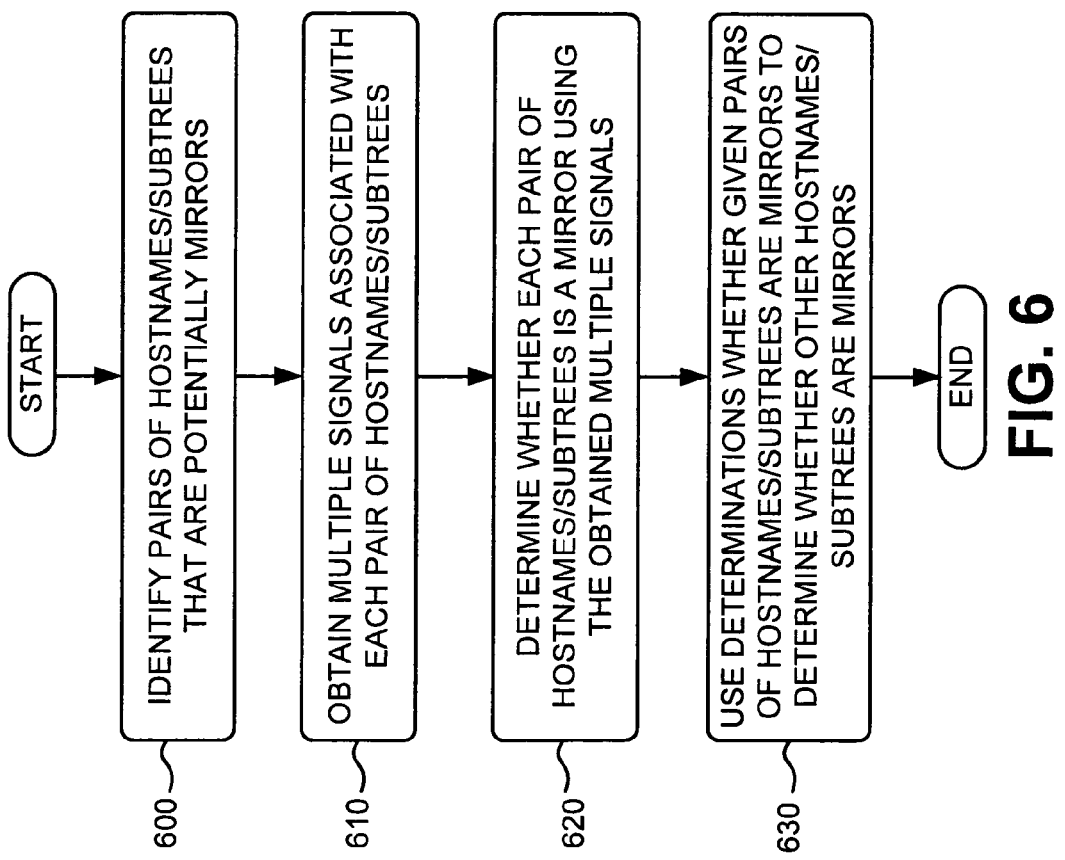
FIG. 6 is a flowchart of an exemplary process for determining mirrors consistent with principles of the invention.

FIG. 6 is a flowchart of an exemplary process for determining whether pairs of hostnames/subtrees are mirrors. The process exemplified by FIG. 6 may be implemented by mirror detector 520 of web crawler engine 410.

Figure 7:
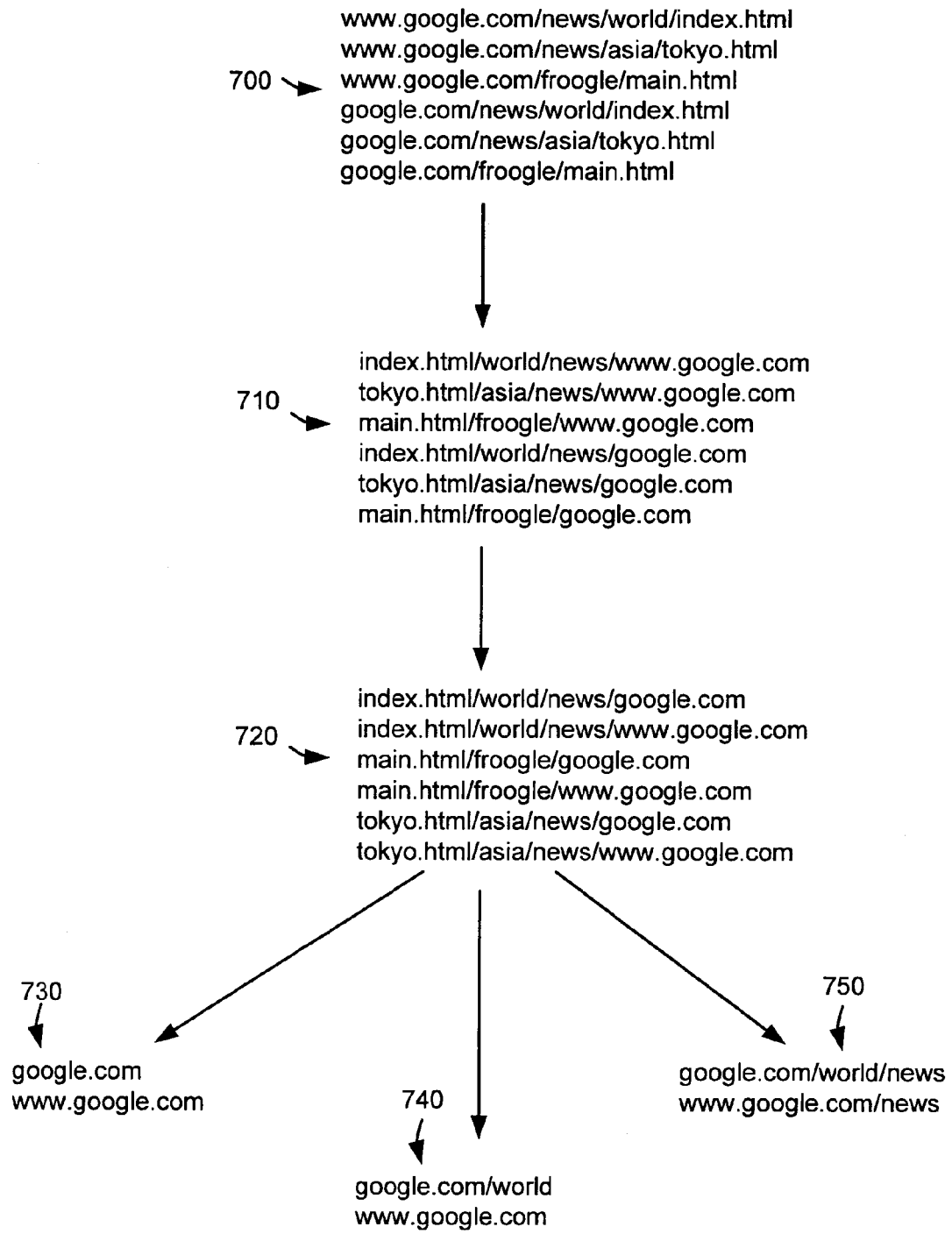
FIG. 7 is a diagram of a technique for identifying pairs of hostnames/subtrees that are potentially mirrors consistent with an aspect of the invention.

The exemplary process may begin with the identification of one or more pairs of hostnames/subtrees as potentially being mirrors (block 600). For computational efficiency, hostnames/subtrees from a group of hostnames/subtrees may be selectively paired. In one implementation, hostnames/subtrees may be selectively paired by reversing the path components of the URLs of the hostnames/subtrees and then sorting the URLs to identify pairwise URLs that have similar sitemaps. For example, as shown at 700 in FIG. 7, given the URLs www.google.com/news/world/index.html, www.google.com/news/asia/tokyo.html, www.google.com/froogle/main.html, google.com/news/world/index.html, google.com/news/asia/tokyo.html and google.com/froogle/main.html, the path components of the URLs can be reversed, as shown at 710 in FIG. 7, to produce the following reversed URLs: index.html/world/news/www.google.com, tokyo.html/asia/news/www.google.com, main.html/froogle/www.google.com, index/html/world/news/google.com, tokyo.html/asia/news/google.com and main.html/froogle/google.com. As shown in FIG. 7 at 720, the reversed URLs may be sorted based on their reversed path components, with URLs having similar path components being sorted sequentially adjacent to one another within a sorted list:

index.html/world/news/google.com
 index.html/world/news/www.google.com
 main.html/froogle/google.com
 main.html/froogle/www.google.com
 tokyo.html/asia/news/google.com
 tokyo.html/asia/news/www.google.com Pairs of adjacent URLs may then be used to identify hostnames or subtrees that are potential mirrors based on the similarity between their sitemaps. For example, from the sorted list 720 of FIG. 7, it can be seen that the hostnames google.com and www.google.com 730 have similar sitemaps and are, thus, potential mirrors. Additionally, subtrees google.com/world and www.google.com 740 have similar sitemaps and are, thus, potential mirrors. Subtrees google.com/world/news and www.google.com/news 750 have similar sitemaps and are, thus, potential mirrors. The sitemaps of each pair of adjacent URLs in sorted list 720 may be compared to identify hostnames and/or subtrees that are potential mirrors.

Multiple signals associated with each pair of hostnames/subtrees may be obtained (block 610). The multiple signals for each pair of hostnames/subtrees may be obtained from various sources, including, for example, a crawl repository, hostname-to-IP DNS maps, "who is" databases, or other sources of host specific information. The signals associated with each pair of hostnames may include multiple ones of the following:

1) whether the link structure and/or sitemap for the two hostnames/subtrees are similar or the same;
 2) whether the same or nearly duplicate content is associated with each of the two hostnames/subtrees;
 3) whether the two hostnames/subtrees have the same Internet Protocol (IP) address or subnet from the DNS map;
 4) whether the two hostnames/subtrees have the same owner (e.g., obtained from a "who is" database);
 5) whether hostnames associated with the two hostnames/subtrees are similar; and/or
 6) redirect information associated with each hostname/subtree (e.g., if one of the hostnames/subtrees redirects to the other hostname/subtree of the pair).

Consistent with aspects of the invention, other signals, not described herein, may be used, alternatively, or in addition to the signals set forth above.

A determination may be made whether each pair of hostnames/subtrees is a mirror using the obtained multiple signals associated with each pair of hostnames/subtrees (block 620). The determination may be performed using a function and/or an algorithm to assign weights to each of the multiple signals. The assigned weights may be then be used to calculate a confidence level that indicates whether the two hostnames/subtrees are mirrors. The calculated confidence levels may be used to determine which pairs of hostnames/subtrees are mirrors. The following pseudo-code represents one exemplary algorithm for assigning weights to the multiple signals, and using the assigned weights to calculate a confidence level that indicates whether two hostnames/subtrees are mirrors:

let Ra be the redirect target of A (Ra=A if URLs from A do not redirect, otherwise Ra=the target host of the redirects).
 let Rb be the redirect target of B
 let SameRedir=1 if Ra=Rb, 0 if not.
 let Na=number of crawled pages on A and Nb=number of crawled pages
 let Me=number of corresponding pages (with matching suffix) on A and B that share the exact content.
 let Ms=number of corresponding pages (with matching suffix) on A and B that are approximately the same.
 let E=edit distance between hostname of A and hostname of B (on scale of 0 and 1); "E indicates similarity between hostname of A and hostname of B".
 let SameIP=1 if IP address of A=IP address of B else SameIP=0.
 let SameOwner=1 if A and B have same :who is" owner else SameOwner=0;
confidence_for_mirror(A, B)=max(1, SameRedir+0.9*SameIP+0.1*SameOwner+0.15*(1−E)+(Me+0.8*Ms)*2/(Na+Nb));

The above pseudo-code calculates the confidence value (confidence_for_mirror(A,B)) between 0 and 1, where 1 equals a 100% confidence that A and B are mirrors. One skilled in the art will recognize that other functions or algorithms may alternatively be used determining whether a pair of hostnames/subtrees are mirrors of one another using the obtained multiple signals associated with each pair of hostnames/subtrees.

The determinations whether given pairs of hostnames/subtrees are mirrors may further be used to determine whether other hostnames/subtrees are mirrors (block 630). Various techniques may be employed to use the determinations whether given pairs of hostnames/subtrees are mirrors to ascertain whether other hostnames/subtrees are mirrors. For example, if hostnames/subtrees A and B are determined to be mirrors, and hostnames/subtrees B and C are determined to be mirrors, transitive closure can be performed to identify hostnames/subtrees A, B and C as mirrors.

Once a given hostname/subtree has been determined to be a mirror of another hostname/subtree, the given hostname/subtree can be excluded from subsequent search engine crawling and indexing, thus, reducing crawl bandwidth demand, reducing wasted space in the index, and reducing crawl load on the website having the two hostnames/subtrees that are mirrors.

CONCLUSION

The foregoing description of implementations consistent with principles of the invention provides illustration and description, but is not intended to be exhaustive or to limit the invention to the precise form disclosed. Modifications and variations are possible in light of the above teachings, or may be acquired from practice of the invention. For example, while a series of acts has been described with regard to FIG. 6, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   identifying, by a processor associated with the computer, path components of addresses that are associated with a group of hosts;
   reversing, by a processor associated with the computer, the path components;
   sorting, by a processor associated with the computer, the addresses based on the reversed path components;
   identifying, by a processor associated with the computer, an adjacent pair of addresses from the sorted addresses, the adjacent pair of addresses including:
      a first address associated with a first host of the group of hosts, and
      a second address associated with a second host of the group of hosts;
   identifying, by a processor associated with the computer and based on identifying the adjacent pair of addresses, the first host as a potential mirror of the second host that differs from the first host;
   determining, by a processor associated with the computer, first information associated with the first host and second information associated with the second host;
   calculating, by a processor associated with the computer, a score based on the first information and the second information;
   determining, by a processor associated with the computer, whether to classify the first host as an actual mirror of the second host,
      the first host being classified as the actual mirror of the second host when the score satisfies a particular threshold value; and
   storing, by a processor associated with the computer, information identifying whether the first host is the actual mirror of the second host.

2. The computer-implemented method of claim 1,
   where the first information includes first content associated with the first host,
   where the second information includes second content associated with the second host,
   where the method further comprises:
      determining a content-based similarity of the first host and the second host from the first content and the second content, and
   where calculating the score comprises:
      calculating the score based on the content-based similarity.

3. The computer-implemented method of claim 2, where determining the content-based similarity of the first host and the second host further comprises:
   identifying an amount of common content included in the first content and the second content, and
   determining the content-based similarity based on the amount of common content.

4. The computer-implemented method of claim 1,
   where the first information includes a first internet protocol (IP) address associated with the first host,
   where the second information includes a second IP address associated with the second host,
   where the method further comprises:
      comparing the first IP address associated with the first host and the second IP address associated with the second host; and
      determining an IP-based similarity for the first host and the second host based on comparing the first IP address and the second IP address, and where calculating the score comprises:
         calculating the score based on the IP-based similarity.

5. The computer-implemented method of claim 1,
   where the first information includes information identifying a first owner associated with the first host,
   where the second information includes information identifying a second owner associated with the second host, where the method further comprises:
  determining an owner-based similarity, associated with the first host and the second host, based on a comparison of the first owner and the second owner, and
where calculating the score comprises:
  calculating the score based on the owner-based similarity.

6. The computer-implemented method of claim 1,
where the first information includes a first hostname associated with the first host,
where the second information includes a second hostname associated with the second host,
where the method further comprises:
  determining a hostname-based similarity associated with the first host and the second host based on a comparison of the first hostname and the second hostname, and
where calculating the score comprises:
  calculating the score based on the hostname-based similarity.

7. The computer-implemented method of claim 1, where:
the first information includes a first sitemap associated with the first host,
the second information includes a second sitemap associated with the second host,
the score is based on a first similarity between the first sitemap and the second sitemap,
the score is a first score, and
the method further comprises:
  identifying a second similarity between the first host and a third host, the third host differing from the first host and the second host;
  calculating a second score based on the second similarity between the first host and the third host; and
  identifying the third host as an actual mirror of the second host when both the first score and the second score satisfy the particular threshold value.

8. The computer-implemented method of claim 1, further comprising:
indexing information associated with the first host and the second host based on the information identifying whether the first host is the actual mirror of the second host.

9. The computer-implemented method of claim 1,
where the first information includes a first sitemap associated with the first host,
where the second information includes a second sitemap associated with the second host, and
where calculating the score comprises:
  identifying a similarity between the first sitemap and the second sitemap, and
  calculating the score based on the similarity between the first sitemap and the second sitemap.

10. A system comprising:
one or more devices, at least partially implemented in hardware, configured to:
  identify path components of addresses that are associated with a group of hosts;
  reverse the path components,
  sort the addresses based on the reversed path components;
  identify an adjacent pair of addresses from the sorted addresses,
    the adjacent pair of addresses including:
      a first address associated with a first host of the group of hosts, and
      a second address associated with a second host of the group of hosts;
  identify, based on identifying the adjacent pair of addresses, the first host as a potential mirror of the second host that differs from the first host;
  determine first information that is associated with the first host and second information that is associated with the second host;
  calculate a score based on the first information and the second information; and
  determine whether the first host is an actual mirror of the second host based on the score,
    the first host being the actual mirror of the second host when the score satisfies a particular threshold value.

11. The system of claim 10,
where the first information includes first content associated with the first host,
where the second information includes second content associated with the second host, and
where the one or more devices, when calculating the score, are further configured to:
  determine a content-based similarity of the first host and the second host from the first content and the second content; and
  calculate the score based on the content-based similarity.

12. The system of claim 10,
where the first information includes a first internet protocol (IP) address associated with the first host,
where the second information includes a second IP address associated with the second host, and
where the one or more devices, when calculating the score, are further configured to:
  compare the first IP address associated with the first host and the second IP address associated with the second host;
  determine an IP-based similarity for the first host and the second host based on a comparison of the first IP address and the second IP address; and
  calculate the score based on the IP-based similarity.

13. The system of claim 10,
where the first information includes information identifying a first owner associated with the first host,
where the second information includes information identifying a second owner associated with the second host, and
where the one or more devices, when calculating the score, are further configured to:
  determine an owner-based similarity associated with the first host and the second host based a comparison of the first owner and the second owner; and
  calculate the score based on the owner-based similarity.

14. The system of claim 10,
where the first information includes a first hostname associated with the first host,
where the second information includes a second hostname associated with the second host, and
where the one or more devices, when calculating the score, are further configured to:
  determine a hostname-based similarity, associated with the first host and the second host, based on a comparison of the first hostname and the second hostname; and calculate the score based on the hostname-based similarity.

15. The system of claim 10, where the one or more devices are further configured to:
index information associated with the first host and the second host based on whether the first host is the actual mirror of the second host.

16. The system of claim 10,
where the first information includes a first sitemap associated with the first host,
where the second information includes a second sitemap associated with the second host, and
where the one or more devices, when calculating the score, are configured to:
identify a similarity between the first sitemap and the second sitemap, and
calculate the score based on the similarity between the first sitemap and the second sitemap.

17. A non-transitory memory device to store instructions, the instructions comprising:
one or more instructions which, when executed by one or more processors, cause the one or more processors to identify path components of addresses that are associated with a group of hosts;
one or more instructions which, when executed by the one or more processors, cause the one or more processors to reverse the path components;
one or more instructions which, when executed by the one or more processors, cause the one or more processors to sort the addresses based on the reversed path components;
one or more instructions which, when executed by the one or more processors, cause the one or more processors to identify an adjacent pair of addresses from the sorted addresses,
the adjacent pair of addresses including:
a first address associated with a first host of the group of hosts, and
a second address associated with a second host of the group of hosts;
one or more instructions which, when executed by the one or more processors, cause the one or more processors to identify the first host as a potential mirror of the second host that differs from the first host based on identifying the adjacent pair of addresses;
one or more instructions which, when executed by the one or more processors, cause the one or more processors to determine first information associated with the first host and second information associated with the second host;
one or more instructions which, when executed by the one or more processors, cause the one or more processors to calculate a score based on the first information and the second information; and
one or more instructions which, when executed by the one or more processors, cause the one or more processors to determine whether to classify the first host as an actual mirror of the second host,
the first host being classified as the actual mirror of the second host when the score satisfies a particular threshold value.

18. The non-transitory memory device of claim 17,
where the first information includes first content associated with the first host,
where the second information includes second content associated with the second host, and
where the one or more instructions to calculate the score include:
one or more instructions to determine a content-based similarity of the first host and the second host based on the first content and the second content; and
one or more instructions to calculate the score based on the content-based similarity.

19. The non-transitory memory device of claim 17,
where the first information includes a first internet protocol (IP) address associated with the first host,
where the second information includes a second IP address associated with the second host, and
where the one or more instructions to calculate the score include:
one or more instructions to compare the first IP address associated with the first host and the second IP address associated with the second host;
one or more instructions to determine an IP-based similarity for the first host and the second host based on comparing the first IP address and the second IP address; and
one or more instructions to calculate the score based on the IP-based similarity.

20. The non-transitory memory device of claim 17,
where the first information includes information identifying a first owner associated with the first host,
where the second information includes information identifying a second owner associated with the second host, and
where the one or more instructions to calculate the score include:
one or more instructions to determine an owner-based similarity associated with the first host and the second host based a comparison of the first owner and the second owner; and
one or more instructions to calculate the score based on the owner-based similarity.

21. The non-transitory memory device of claim 17,
where the first information includes a first hostname associated with the first host,
where the second information includes a second hostname associated with the second host, and
where the one or more instructions to calculate the score include:
one or more instructions to determine a hostname-based similarity, associated with the first host and the second host, based on a comparison of the first hostname and the second hostname; and
one or more instructions to calculate the score further based on the hostname-based similarity.

22. The non-transitory memory device of claim 17, where the instructions further comprise:
one or more instructions to index information associated with the first host and the second host based on whether the first host is the actual mirror of the second host.

23. The non-transitory memory device of claim 17,
where the first information includes a first sitemap associated with the first host,
where the second information includes a second sitemap associated with the second host, and
where the one or more instructions to calculate the score include:
one or more instructions to identify a similarity between the first sitemap and the second sitemap, and
one or more instructions to calculate the score based on the similarity between the first sitemap and the second sitemap.

* * * * *